(12) United States Patent
Iwamura et al.

(10) Patent No.: US 8,175,663 B2
(45) Date of Patent: May 8, 2012

(54) RADIO BASE STATION AND MOBILE STATION

(75) Inventors: Mikio Iwamura, Yokohama (JP);
Hiroaki Yamagishi, Yokohama (JP);
Kota Fujimura, Yokosuka (JP);
Hideyuki Sakuramoto, Yokosuka (JP);
Kazunori Obata, Yokosuka (JP);
Takuya Takimoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/058,310

(22) PCT Filed: Aug. 11, 2009

(86) PCT No.: PCT/JP2009/064178
§ 371 (c)(1),
(2), (4) Date: May 4, 2011

(87) PCT Pub. No.: WO2010/018823
PCT Pub. Date: Feb. 18, 2010

(65) Prior Publication Data
US 2011/0201380 A1 Aug. 18, 2011

(30) Foreign Application Priority Data
Aug. 11, 2008 (JP) ................. 2008-207509

(51) Int. Cl.
*H04W 52/02* (2009.01)
(52) U.S. Cl. ............ 455/574; 455/550.1; 370/326; 370/338

(58) Field of Classification Search .......... 455/574, 455/550.1; 370/328, 338, 345, 412
See application file for complete search history.

(56) References Cited

U.S. PATENT DOCUMENTS
7,796,547 B2 * 9/2010 Etemad et al. .......... 370/328
2007/0242634 A1 * 10/2007 Calcev et al. .......... 370/318

FOREIGN PATENT DOCUMENTS
EP 1799003 A1 6/2007
JP 2005-223447 A 8/2005

OTHER PUBLICATIONS

International Search Report PCT/JP2009/064178 mailed Oct. 27, 2009, with English translation thereof (3 pages).
espacenet, Patent Abstract in Japanese Application No. 2005-223447 dated Aug. 18, 2005 (1 page).
3GPP TSG RAN WG2 #63 Tdoc-R2 "Value Tag Extension", NTT DOCOMO, Inc, Jeju, Korea, Aug. 22, 2008 (5 pages).
3GPP TSG-RAN2#62bis meeting R2-083795, Rapporteur (Samsung) Warsaw, Poland, Jun. 30, 2008 (169 pages).

* cited by examiner

*Primary Examiner* — Phuoc Doan
(74) *Attorney, Agent, or Firm* — Osha Liang LLP

(57) ABSTRACT

Provided is a mobile station UE equipped with a broadcast information generation unit (11) which generates broadcast information containing tag information formed by a plurality of bits. The tag information has a value defined only by a plurality of first bit values or by a plurality of first bit values and second bit values. The first bits contain a flag indicating whether the tag information contains the second bits. The broadcast information generation unit (11) updates the tag information value each time the content of the broadcast information is updated.

8 Claims, 6 Drawing Sheets

| | FIRST BIT | | | SECOND BIT | | | |
|---|---|---|---|---|---|---|---|
| | FLAG | FIRST REGION | | | SECOND REGION | | | |
| C1 | 0 | 0 | 0 | 0 | – | – | – | – |
| | : | : | : | : | : | : | : | : |
| C2 | 0 | 1 | 1 | 1 | – | – | – | – |
| D1 | 1 | 0 | 0 | 0 | 0 | 0 | 0 | 0 |
| D2 | 1 | 0 | 0 | 0 | 0 | 0 | 0 | 1 |
| | : | : | : | : | : | : | : | : |
| D3 | 1 | 1 | 1 | 1 | 1 | 1 | 1 | 1 |

FIG. 4

```
SystemInformationBlockType1 ::= SEQUENCE {
    valueTag1st INTEGER(0..7),
    valueTag2nd INTEGER(0..16) OPTIONAL,
} ...
```

FIG. 7

| FLAG | FIRST REGION (FIRST BIT) | | | SECOND REGION (SECOND BIT) | | | |
|---|---|---|---|---|---|---|---|
| 0 | 0 | 0 | 0 | – | – | – | – |
| : | : | : | : | : | : | : | : |
| 0 | 1 | 1 | 1 | – | – | – | – |
| 1 | 0 | 0 | 0 | 0 | 0 | 0 | 0 |
| 1 | 0 | 0 | 0 | 0 | 0 | 0 | 1 |
| : | : | : | : | : | : | : | : |
| 1 | 1 | 1 | 1 | 1 | 1 | 1 | 1 |

C1, C2, D1, D2, D3

RADIO BASE STATION AND MOBILE STATION

TECHNICAL FIELD

The present invention relates to a radio base station and a mobile station.

BACKGROUND ART

A LTE (Long Term Evolution) mobile communication system is configured such that a "value tag" is included in broadcast information transmitted by a radio base station eNB. The "value tag" is configured to be increased every time the broadcast information is updated.

The LTE mobile communication system is also configured such that the "value tag" is transmitted in a SIB1 (System Information Block 1).

Further, the "value tag" is configured not to be increased even when either a MIB or the SIB1 is updated, since the "value tag" represents version information of broadcast information of each of a SIB2 and subsequent blocks.

Further, for a case where a mobile station UE in standby mode in a cell #1 moves to a cell #2 and then goes back to the cell #1 again as shown in FIG. 1, the mobile station UE is configured to recognize, within six hours, that the mobile station UE has received the latest broadcast information already if the mobile station UE receives broadcast information having the non-updated "value tag" in the cell #1.

SUMMARY OF THE INVENTION

Problem to be Solved by the Invention

However, since the "value tag" is of four bit length, the LTE mobile communication system has a problem that the maximum number of times that broadcast information can be changed within six hours is only 16 times.

The present invention has been therefore made in view of the above problem. An objective of the present invention is to provide a radio base station and a mobile station which allow increasing the number of times that broadcast information can be changed while minimizing an influence of an increase in the number of bits in a "value tag" on a radio resource.

Means for Solving the Problems

A first feature of the present invention is summarized as a radio base station including: a broadcast information generation unit configured to generate broadcast information including tag information formed of a plurality of bits; and a broadcast information transmission unit configured to transmit the broadcast information, wherein a value of the tag information is defined by only values of a plurality of first bits or by the values of the plurality of first bits and a value of a second bit, the plurality of first bits include a flag indicating whether or not the tag information includes the second bit, and the broadcast information generation unit updates the value of the tag information every time a content of the broadcast information is updated.

A first feature of the present invention is summarized as a mobile station including: a broadcast information reception unit configured to receive broadcast information; and a check unit configured to check whether or not a value of tag information included in received given broadcast information is updated, wherein the value of the tag information is defined by only values of a plurality of first bits or by the values of the plurality of first bits and a value of a second bit, the plurality of first bits include a flag indicating whether or not the tag information includes the second bit, the check unit calculates the value of the tag information by setting the first bits other than the flag to a value of a first parameter included in the given broadcast information, setting a value of the flag on the basis of whether or not a second parameter is included in the given broadcast information, and setting the second bit to a value of the second parameter, and the broadcast information reception unit receives the rest of the broadcast information if it is confirmed that the value of the tag information is updated.

Effect of the Invention

As described above, according to the present invention, provide are a radio base station and a mobile station which allow increasing the number of times that broadcast information can be changed while minimizing an influence of an increase in the number of bits in a "value tag" on a radio resource.

BRIEF DESCRIPTION OF THE DRAWINGS

FIG. 4 is a diagram showing an example of a SIB1 to be transmitted by the radio base station according to the first embodiment of the present invention.

FIG. 7 is a diagram showing an example of a "value tag" to be transmitted by a radio base station according to a modified example 1 of the present invention.

EMBODIMENTS FOR CARRYING OUT THE INVENTION

Mobile Communication System According to First Embodiment of Present Invention A mobile communication system according to a first embodiment of the present invention is described with reference to FIGS. 1 to 5.

Figure 1:
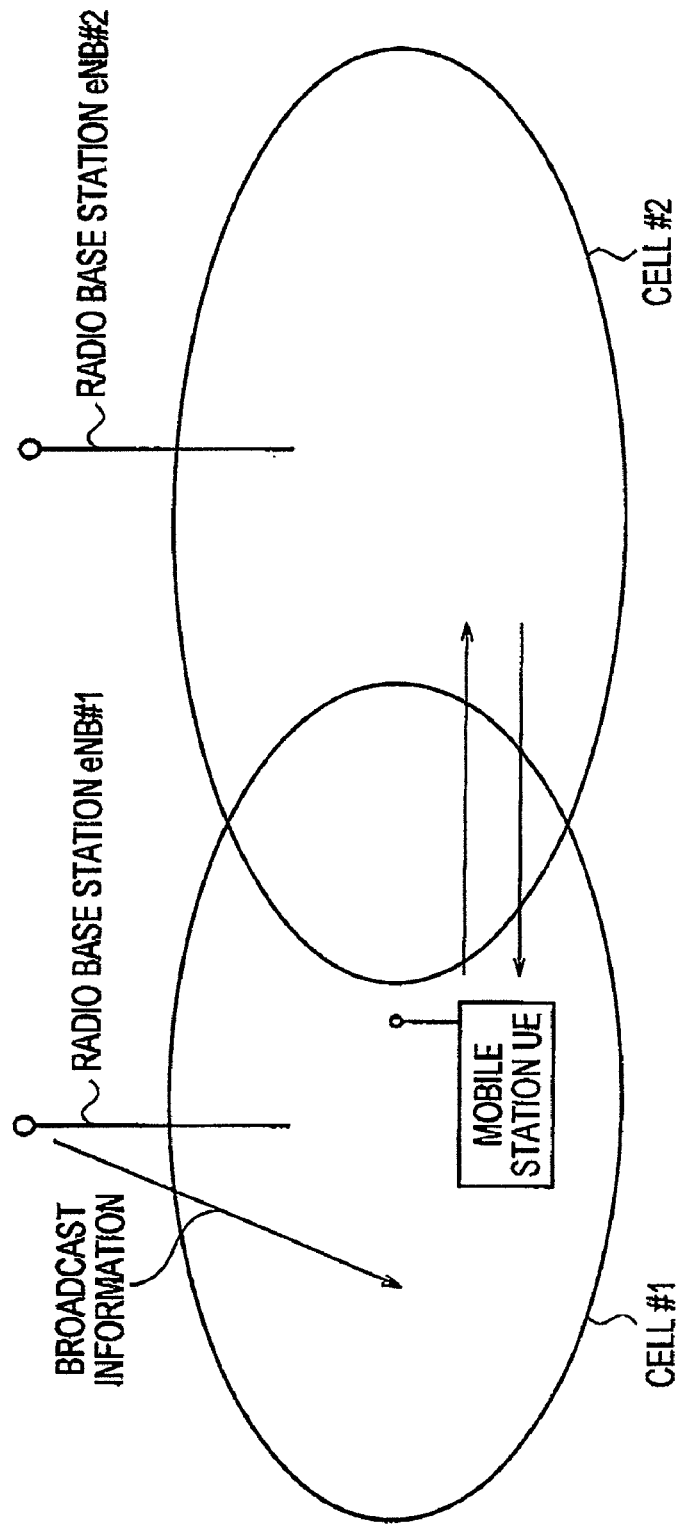
FIG. 1 is a view showing an overall configuration of a mobile communication system according to a first embodiment of the present invention.

As shown in FIG. 1, the mobile communication system according to this embodiment is a LTE (Long Term Evolution) mobile communication system in which radio base stations eNB #1 and #2 are each configured to transmit broadcast information in a corresponding one of cells #1 and #2.

Figures 2, 3:
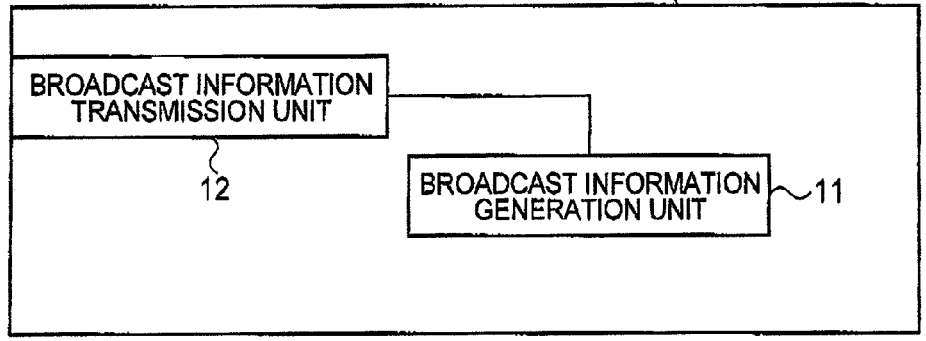
FIG. 2 is a functional block diagram of a radio base station according to the first embodiment of the present invention.
FIG. 3 is a diagram showing an example of a "value tag" to be transmitted by the radio base station according to the first embodiment of the present invention.

Specifically, as shown in FIG. 2, each radio base station eNB includes a broadcast information generation unit 11 and a broadcast information transmission unit 12.

The broadcast information generation unit 11 is configured to generate broadcast information including a "value tag (tag information)" formed of multiple bits.

Here, as shown in FIG. 3, a value of the "value tag" is defined by only values of multiple first bits (bits in a first region and a flag) or by values of multiple first bits (bits in the first region and the flag) and values of second bits (bits in a second region) located as less significant bits than the multiple first bits in the multiple bits.

Note that, in the multiple bits constituting the "value tag," the values of the multiple first bits may be located as less significant bits than those of the second bits.

In other words, the "value tag" may be formed only of the first region and the flag, and may be formed of the first region, the second region, and the flag.

Further, the multiple first bits are configured to include the flag (bit shown as a diagonal line portion in FIG. 3) indicating whether or not the "value tag" includes second bits.

In an example of FIG. 3, the flag is the least significant bit of the multiple first bits. The flag is configured to have a value set to "1" when the "value tag" includes second bits, and set to "0" when the "value tag" does not include second bits.

Here, the broadcast information generation unit 11 is configured to update the value of the "value tag" every time the content of the broadcast information is updated.

For example, the broadcast information generation unit 11 is configured to increase or decrease the value of the "value tag" in series every time the content of the broadcast information is updated. Note that, the broadcast information generation unit 11 may be configured to update the value of the "value tag" in accordance with a predetermined rule every time the content of the broadcast information is updated.

The broadcast information generation unit 11 may also be configured not to update the value of the "value tag" if the content of either a MIB or a SIB1 of the broadcast information is updated.

In the example of FIG. 3, the broadcast information generation unit 11 is configured to update the value of the "value tag (for example, A1 or A2)" including only the first bits on the assumption that "0" is set as bits in a portion for the second bits (i.e., second region) in the "value tag (for example, any of B1 to B5)" including the first bits and the second bits.

For example, the value of the "value tag #A1" is "0," and the value of the "value tag #A2" is "2." Meanwhile, the value of the "value tag #B1" is "16," the value of the "value tag #B2" is "31," the value of the "value tag #B3" is "48," the value of the "value tag #B4" is "63," and the value of the "value tag #B5" is "255."

Thus, the broadcast information generation unit 11 is configured to increase the value of the "value tag" in series, such as in the order of "A1"→"B1"→ . . . → "B2"→"A2"→"B3"→ . . . →"B4"→ . . . →"B5," every time the content of the broadcast information is updated.

The broadcast information transmission unit 12 is configured to transmit the broadcast information generated by the broadcast information generation unit 11. To be more specific, the broadcast information transmission unit 12 may be configured to transmit the broadcast information, which is generated by the broadcast information generation unit 11, in a SIB1 at a cycle of 80 ms.

For example, as shown in FIG. 4, the broadcast information transmission unit 12 is configured to include, in the SIB1, the first bits in a first parameter "valueTag1st" and the second bits in a second parameter "valueTag2nd."

Figure 5:
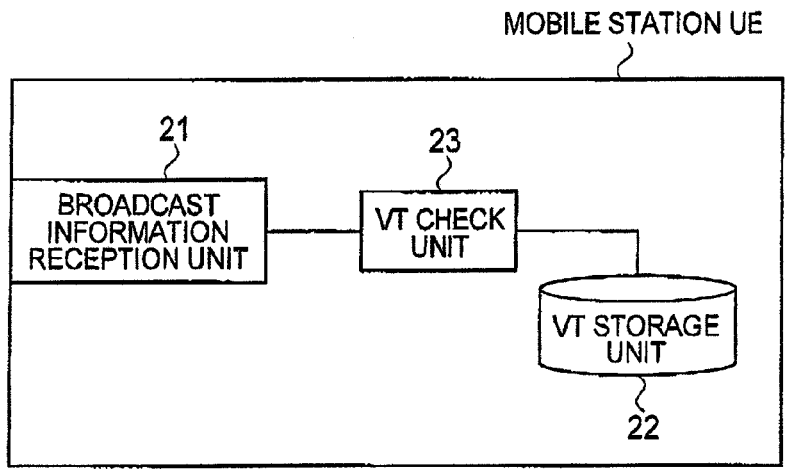
FIG. 5 is a functional block diagram of a mobile station according to the first embodiment of the present invention.

As shown in FIG. 5, a mobile station UE includes a broadcast information reception unit 21, a VT storage unit 22, and a VT check unit 23.

The broadcast information reception unit 21 is configured to receive broadcast information (for example, MIB and SIB1 to SIB8) transmitted in each cell. To be more specific, the broadcast information reception unit 21 is configured to receive the MIB and the SIB1 and transfer them to the VT check unit 23, and to receive the rest of the broadcast information (SIB1 to SIB8) in response to a notification from the VT check unit 23.

The VT storage unit 22 is configured to store the value of the "value tag" included in the latest broadcast information received by the broadcast information reception unit 21.

The VT check unit 23 is configured to check whether or not the value of the "value tag" included in the received given broadcast information (for example, SIB1) has been updated.

Here, the VT check unit 23 is configured to notify the broadcast information reception unit 21 of the fact that the value of the "value tag" included in the received given broadcast information (for example, SIB1) has been updated if the VT check unit 23 confirms the fact.

The VT check unit 23 is also configured to calculate the value of the "value tag" by setting the first bits other than the flag (bits in the first region) to a value of the first parameter "valueTag1st" included in the given broadcast information (for example, SIB1), setting a value of the flag on the basis of whether or not the second parameter "valueTag2nd" is included in the given broadcast information (for example, SIB1), and setting the second bits (bits in the second region) to a value of the second parameter "valueTag2nd."

Hereinbelow, description is given of an operation of the mobile station according to the first embodiment of the present invention with reference to FIG. 6.

Figure 6:
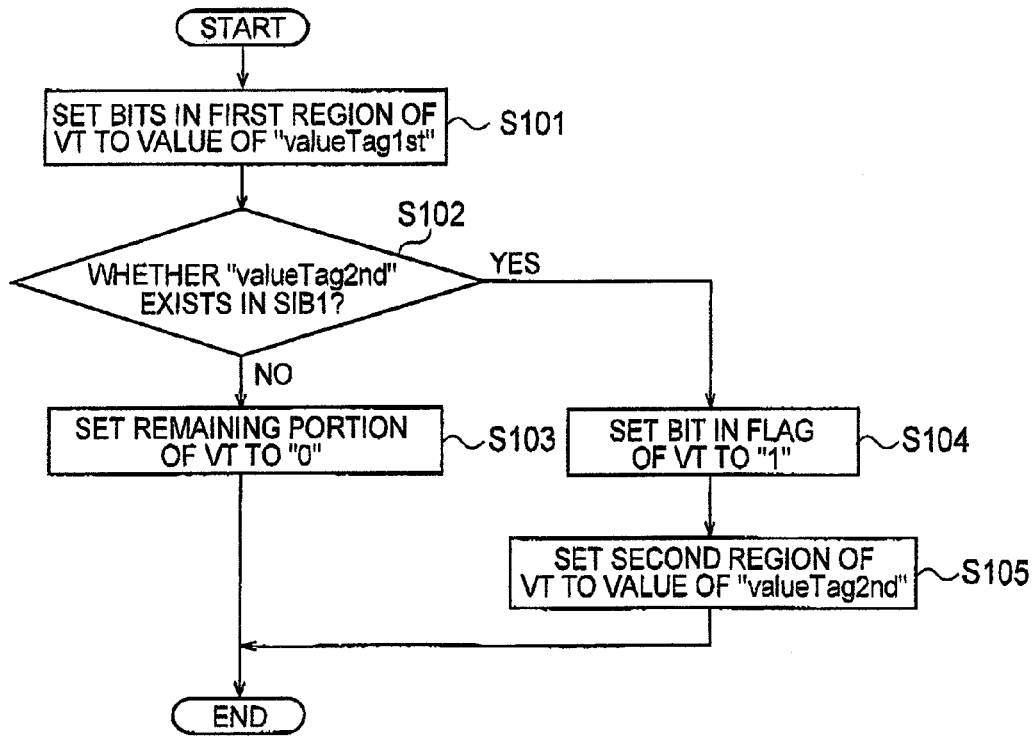
FIG. 6 is a flowchart showing an operation of the mobile station according to the first embodiment of the present invention.

As shown in FIG. 6, in Step S101, the mobile station UE sets the first to third bits of the first bits (i.e., bits in the first region) in the "value tag" to a value of the first parameter "valueTag1st" included in the received SIB1.

In Step S102, the mobile station UE judges whether or not the second parameter "valueTag2nd" is included in the SIB1.

If judging that the second parameter "valueTag2nd" is not included, the mobile station UE sets "0" as the rest of the bits in the "value tag" in Step S103.

On the other hand, if judging that the second parameter "valueTag2nd" is included, the mobile station UE sets the fourth bit of the first bits (i.e., bit in the flag) in the "value tag" to "1" in Step S104, and sets the second bits (i.e., bits in the second region) in the "value tag" to a value of the second parameter "valueTag2nd" included in the SIB1 in Step S105.

The mobile communication system according to the first embodiment of the present invention allows increasing the number of times that broadcast information can be changed while minimizing an influence of an increase in the number of bits in the "value tag" on a radio resource, in a case where regulation needs to be applied at the time of congestion in the mobile communication system or where parameters related to transmission power control and the like need to be frequently changed.

Modified Example 1

A mobile communication system according to a modified example 1 of the present invention is described with reference to FIGS. 7 and 8. Hereinbelow, the mobile communication system according to the modified example 1 is described focusing on a difference with the mobile communication system according to the first embodiment described above.

An example of FIG. 7 is configured such that a flag is the most significant bit of multiple first bits and that a value of the flag is set to "1" when a "value tag" includes second bits, and is set to "0" when the "value tag" does not include second bits.

In the example of FIG. 7, the broadcast information generation unit 11 is configured to update the value of the "value tag (for example, any of C1 and C2)" including only the first bits on the assumption that "0" is set as bits in a portion for the second bits (i.e., second region) in the "value tag (for example, any of D1 to D3)" including the first bits and the second bits.

For example, the value of the "value tag #C1" is "0," and the value of the "value tag #C2" is "7." Meanwhile, the value of the "value tag #D1" is "128," the value of the "value tag #D2" is "129," and the value of the "value tag #D3" is "255."

Thus, the broadcast information generation unit 11 is configured to increase the value of the "value tag" in series, such as in the order of "C1"→ . . . →"C2"→"D1"→"D2"→ . . . → "D3," every time the content of the broadcast information is updated.

Hereinbelow, description is given of an operation of a mobile station according to the modified example 1 of the present invention with reference to FIG. 8.

Figure 8:
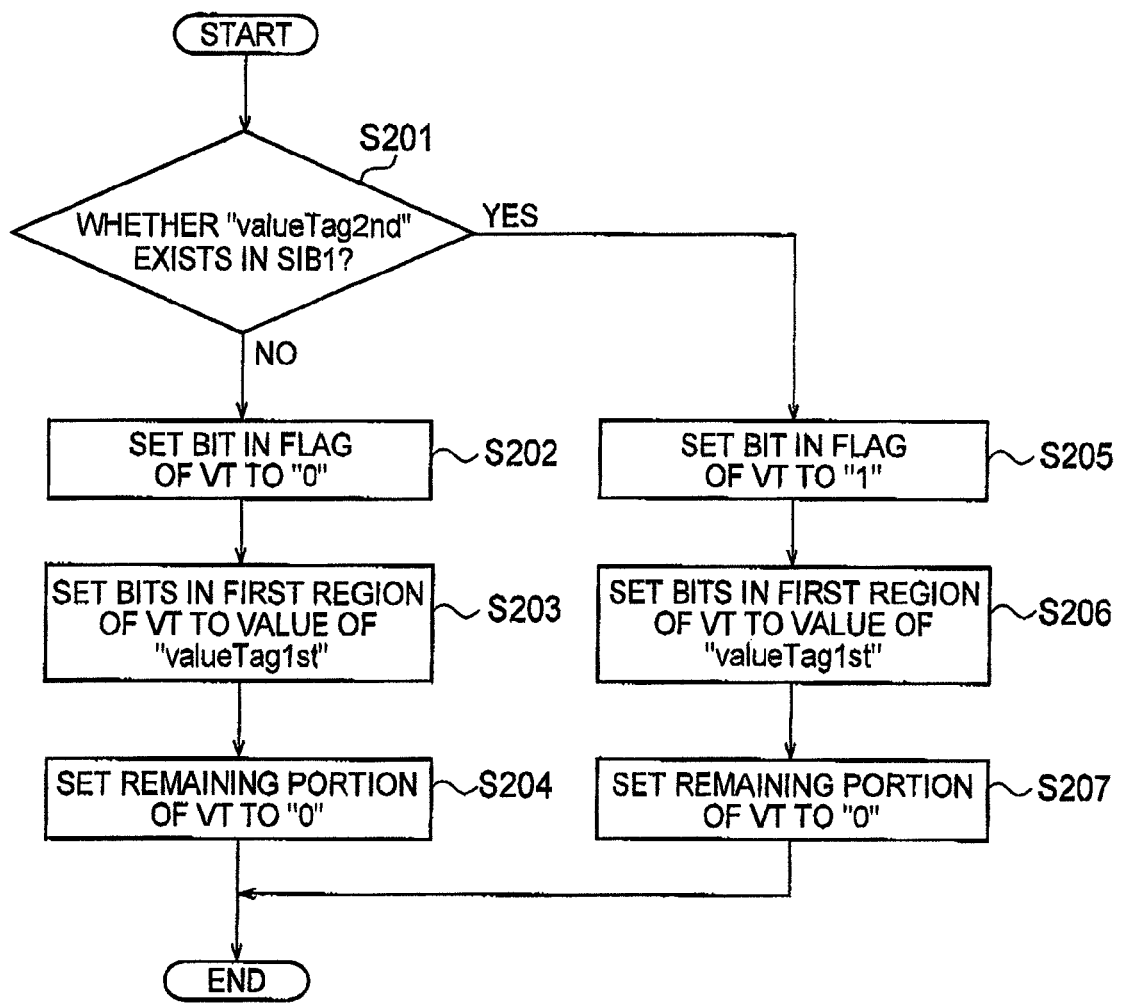
FIG. 8 is a flowchart showing an operation of a mobile station according to the modified example 1 of the present invention.

As shown in FIG. 8, in Step S201, the mobile station UE judges whether or not a second parameter "valueTag2nd" is included in a received SIB1.

If judging that the second parameter "valueTag2nd" is not included, the mobile station UE sets "0" as the first bit (bit in the flag) of the first bits in the "value tag" in Step S202.

In Step S203, the mobile station UE sets the second to fourth bits of the first bits (bits in the first region) in the "value tag" to a value of a first parameter "valueTag1st" included in the SIB1 in Step S203.

In Step S204, the mobile station UE sets "0" as the rest of the bits in the "value tag."

On the other hand, if judging that the second parameter "valueTag2nd" is included, the mobile station UE sets the first bit of the first bits (i.e., bit in the flag) in the "value tag" to "1" in Step S205, and sets the second to fourth bits of the first bits (i.e., bits in the first region) in the "value tag" to the value of the first parameter "valueTag1st" included in the SIB1 in Step S206.

In Step S207, the mobile station UE sets "0" as the rest of the bits in the "value tag."

The feature of the present embodiment described above may be expressed as follows.

A first feature of the present embodiment is summarized as a radio base station eNB including: a broadcast information generation unit 11 configured to generate broadcast information including "Value tag (tag information)" formed of a plurality of bits; and a broadcast information transmission unit 12 configured to transmit the broadcast information, wherein a value of the "Value tag" is defined by only values of a plurality of first bits (bits in a first region and a flag) or by the values of the plurality of first bits and a value of a second bit (bits in second region) located at a less significant bit than the plurality of first bits (bits in a first region and a flag), the plurality of first bits include a flag indicating whether or not the "Value tag" includes the second bit, and the broadcast information generation unit 11 updates the value of the "Value tag" every time a content of the broadcast information is updated.

In the first feature of the present embodiment, the broadcast information generation unit 11 may increase or decrease the value of the "Value tag" in series every time the content of the broadcast information is updated.

In the first feature of the present embodiment, the flag may be the least significant bit of the plurality of first bits, a value of the flag may be set to "1" when the "Value tag" includes the second bit, and be set to "0" when the "Value tag" does not include the second bit, and the broadcast information generation unit 11 may update the value of the "Value tag" including only the first bits on the assumption that "0" is set as a bit in a portion for the second bit in the "Value tag" including the first bits and the second bit.

In the first feature of the present embodiment, the flag may be the most significant bit of the plurality of first bits.

In the first feature of the present embodiment, the broadcast information transmission unit 12 may transmit the "Value tag" in a SIB1, and the broadcast information generation unit 11 may not update the value of the "Value tag" even when a content of either a MIB or the SIB1 is updated.

In the first feature of the present embodiment, the second bit is located as a less significant bit than the plurality of first bits in the plurality of bits forming the "Value tag".

A second feature of the present embodiment is summarized as a mobile station UE including: a broadcast information reception unit 21 configured to receive broadcast information; and a VT check unit 22 configured to check whether or not a value of "Value tag" included in received given broadcast information (SIB) is updated, wherein the value of the "Value tag" is defined by only values of a plurality of first bits or by the values of the plurality of first bits and a value of a second bit, the plurality of first bits include a flag indicating whether or not the "Value tag" includes the second bit, the VT check unit 22 calculates the value of the "Value tag" by setting the first bits other than the flag to a value of a first parameter (valueTag1st) included in the given broadcast information (SIB1), setting a value of the flag on the basis of whether or not a second parameter (valueTag2nd) is included in the given broadcast information, and setting the second bit to a value of the second parameter (valueTag2nd), and the broadcast information reception unit 21 receives the rest of the broadcast information if it is confirmed that the value of the "Value tag" is updated.

In the second feature of the present embodiment, the second bit may be located as a less significant bit than the plurality of first bits in the plurality of bits forming the "Value tag".

Note that operation of the above described radio base station eNB and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station eNB and the mobile station UE. Also, the storage medium and the processor may be provided in the radio base station eNB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station comprising:
   a broadcast information generation unit configured to generate broadcast information including tag information formed of a plurality of bits; and
   a broadcast information transmission unit configured to transmit the broadcast information, wherein
   a value of the tag information is defined by only values of a plurality of first bits or by the values of the plurality of first bits and a value of a second bit,
   the plurality of first bits include a flag indicating whether or not the tag information includes the second bit, and
   the broadcast information generation unit updates the value of the tag information every time a content of the broadcast information is updated.

2. The radio base station according to claim 1, wherein the broadcast information generation unit increases or decreases the value of the tag information in series every time the content of the broadcast information is updated.

3. The radio base station according to claim 2, wherein
   the flag is the least significant bit of the plurality of first bits,
   a value of the flag is set to "1" when the tag information includes the second bit, and is set to "0" when the tag information does not include the second bit, and
   the broadcast information generation unit updates the value of the tag information including only the first bits on the assumption that "0" is set as a bit in a portion for the second bit in the tag information including the first bits and the second bit.

4. The radio base station according to claim 2, wherein the flag is the most significant bit of the plurality of first bits.

5. The radio base station according to claim 1, wherein
   the broadcast information transmission unit transmits the tag information in a SIB1, and
   the broadcast information generation unit does not update the value of the tag information even when a content of either a MIB or the SIB1 is up dated.

6. The radio base station according to claim 1, wherein the second bit is located as a less significant bit than the plurality of first bits in the plurality of bits.

7. A mobile station comprising:
   a broadcast information reception unit configured to receive broadcast information; and
   a check unit configured to check whether or not a value of tag information included in received given broadcast information is updated, wherein
   the value of the tag information is defined by only values of a plurality of first bits or by the values of the plurality of first bits and a value of a second bit,
   the plurality of first bits include a flag indicating whether or not the tag information includes the second bit,
   the check unit calculates the value of the tag information by setting the first bits other than the flag to a value of a first parameter included in the given broadcast information, setting a value of the flag on the basis of whether or not a second parameter is included in the given broadcast information, and setting the second bit to a value of the second parameter, and
   the broadcast information reception unit receives the rest of the broadcast information if it is confirmed that the value of the tag information is updated.

8. The mobile station according to claim 7, wherein the second bit is located as a less significant bit than the plurality of first bits in the plurality of bits.

* * * * *